J. A. MOORE.
SWINGING-GATE.

No. 171,158. Patented Dec. 14, 1875.

Witnesses:
Lewis F. Brous
F. A. Lambert

Inventor:
James A. Moore
by John A. Wiedersheim
Atty.

UNITED STATES PATENT OFFICE.

JAMES A. MOORE, OF KEWANNA, INDIANA.

IMPROVEMENT IN SWINGING GATES.

Specification forming part of Letters Patent No. 171,158, dated December 14, 1875; application filed August 30, 1875.

*To all whom it may concern:*

Be it known that I, JAMES A. MOORE, of Kewanna, in the county of Fulton and State of Indiana, have invented a new and useful Improvement in Gates; and I do hereby declare the following to be a clear and exact description of the nature thereof, sufficient to enable others skilled in the art to which my invention appertains to fully understand, make, and use the same, reference being had to the accompanying drawings, making part of this specification, in which—

Figure 1:
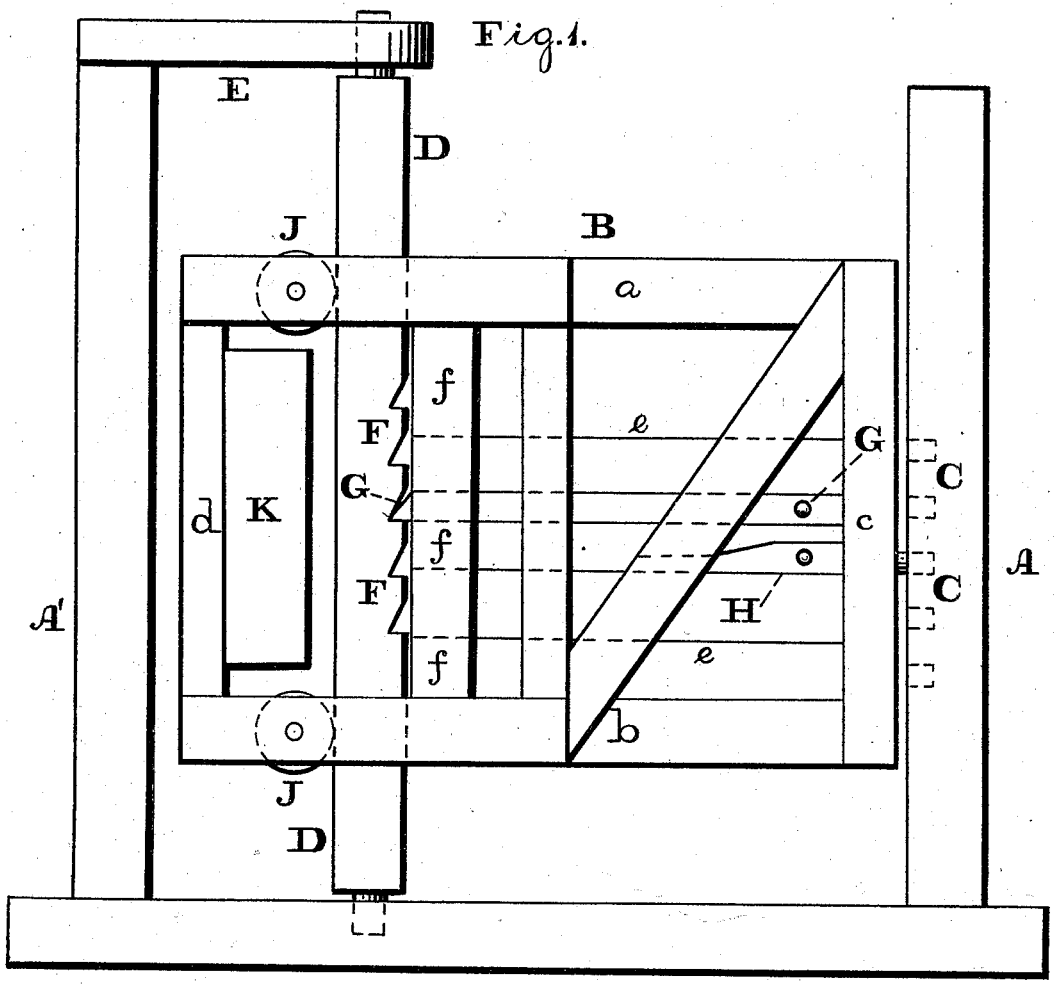
Figure 2:
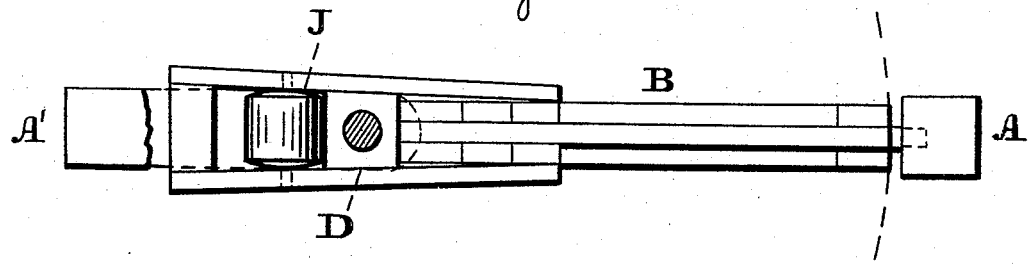

Figure 1 is a front view of the gate embodying my invention. Fig. 2 is a top or plan view thereof.

Similar letters of reference indicate corresponding parts in the two figures.

My invention consists in a swinging gate, which is vertically adjustable according to circumstances requiring the same.

Referring to the drawings, A A' represent the gate-posts, and B the gate. In the post A, on the inner side thereof, there are formed a series of horizontally-arranged openings, C. D represents an upright post, the upper end of which is swiveled to an arm or bearing, E, on the post A', and the lower end is swiveled to a base or in the ground, as shown in Fig. 1. On the side of the post D facing the post A there are formed a series of notches or teeth, F, which correspond in number and location with the openings C in the post A. The gate B is constructed of the top, bottom, and side bars *a b c d*, the parallel horizontal bars *e*, and the upright bar *f* between the side bars *c d*.

The gate is hung on the swiveled post D, which occupies a position between the side bar *d* and the upright bar *f*, and is adapted to rise and fall on said post D. To the gate there is fitted a horizontally-sliding bolt, G, whose end adjacent to the post D is adapted to enter one of the notches F in said beam.

It will now be seen that when the gate requires to be raised or lowered the sliding bolt or bar G is moved toward the post A, so as to clear the notch F, with which it engages. Then raise or lower the gate, and when it is at its adjusted position slide the bolt or bar G into the corresponding notch in the beam, and the gate will be held in the adjusted position.

The gate may be opened by turning it on the post D as an axis, and said gate has a latch or fastening, H, which enters the opening C of the post A.

To the gate near the side bar *d* I secure two or more rollers, J, which bear against, and roll on, the post D, and serve to ease the movements of the gate in its raising and lowering adjustments, and prevent sagging of the gate, which latter defection is also prevented by balancing the gate on the post D. For this purpose I secure to the side bar *d* a weighted block or piece, K, which occupies a position between the bar *f* and bar *d*, or in the space of the gate extended beyond the post D, said block acting as a counterpoise to the weight of the gate between the post D and end adjacent to the post A.

The gate is confined on the post D, and prevented from longitudinal movement in one direction by the upright bar *f*, and in the other direction by the rollers J; but said bar and rollers in nowise interfere with the vertical adjustment of the gate.

Having thus described my invention, what I claim as new, and desire to secure by Letters Patent, is—

The vertically-adjustable gate B, carrying the rollers J, in combination with the swiveled post D, formed with notches F, and the sliding bolt G, substantially as and for the purpose set forth.

JAMES A. MOORE.

Witnesses:
SALATHIEL BROWN,
JOHN J. CARTER.